(12) United States Patent
Fuse

(10) Patent No.: US 12,170,749 B2
(45) Date of Patent: Dec. 17, 2024

(54) CLOUD LINK SYSTEM FOR TRANSMITTING INFORMATION ABOUT CLOUD SERVICES USABLE IN AN IMAGE FORMING APPARATUS

(71) Applicant: CANON KABUSHIKI KAISHA, Tokyo (JP)

(72) Inventor: Hiroshi Fuse, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/062,276

(22) Filed: Dec. 6, 2022

(65) Prior Publication Data

US 2023/0179725 A1 Jun. 8, 2023

(30) Foreign Application Priority Data

Dec. 8, 2021 (JP) .................................. 2021-199142

(51) Int. Cl.
*H04N 1/00* (2006.01)
(52) U.S. Cl.
CPC ..... *H04N 1/00941* (2013.01); *H04N 1/00427* (2013.01); *H04N 1/00952* (2013.01)

(58) Field of Classification Search
None
See application file for complete search history.

(56) References Cited

U.S. PATENT DOCUMENTS

2013/0163027 A1* 6/2013 Shustef ............... H04L 63/0209
358/1.14
2019/0394188 A1* 12/2019 Kodama ............. H04L 63/0815

FOREIGN PATENT DOCUMENTS

JP 2018156405 A * 10/2018
JP 2020088759 A 6/2020

OTHER PUBLICATIONS

Both Japanese and English Translation with corresponding paragraph numbers (Year: 2018).*

* cited by examiner

*Primary Examiner* — Miya J Cato
(74) *Attorney, Agent, or Firm* — Canon U.S.A., Inc. IP Division

(57) ABSTRACT

A cloud link system is connected with another cloud link system. In a list of cloud services includes a first cloud service connected to the cloud link system without the another cloud link system and a second cloud service connected to the another cloud link system.

8 Claims, 7 Drawing Sheets

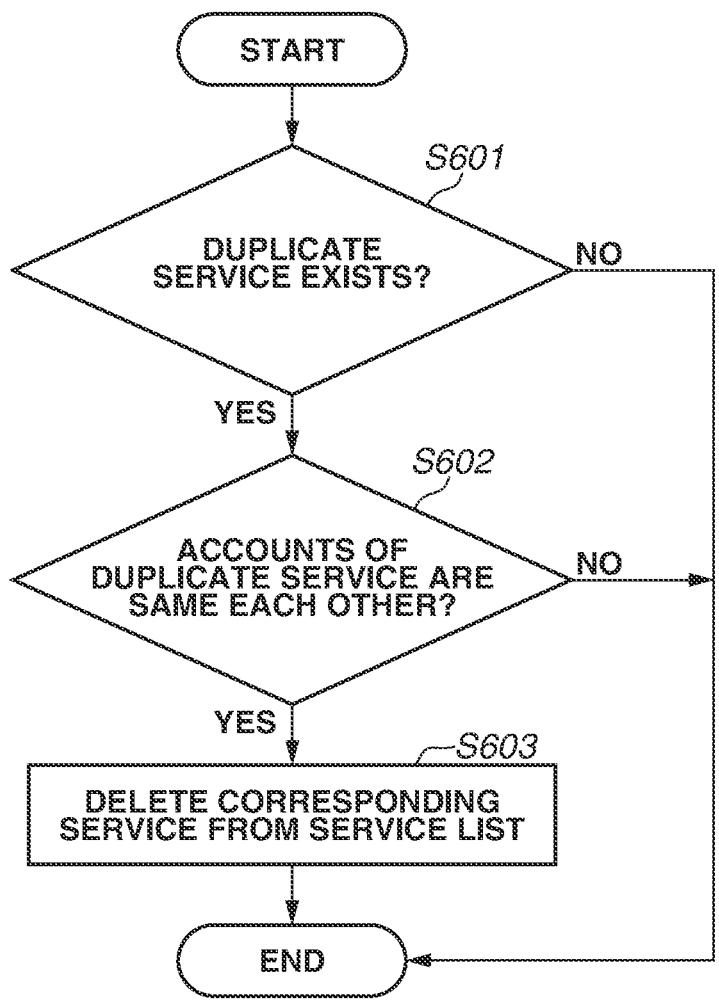

ns/sup>
CLOUD LINK SYSTEM FOR TRANSMITTING INFORMATION ABOUT CLOUD SERVICES USABLE IN AN IMAGE FORMING APPARATUS

BACKGROUND

Field

The present disclosure relates to a cloud system, a cloud link system, an image forming apparatus, a control method, and a non-transitory storage medium.

Description of the Related Art

In accordance with the recent trend toward diversification of working styles, new working styles including teleworking and satellite office working have been introduced among companies, and cloud services have been actively used to improve operational efficiency. Accordingly, image forming apparatuses that have been conventionally used mainly in offices are used irrespective of user locations, and a solution for transmitting scanned image data to a cloud service is added as a function of the image forming apparatuses. Examples of such a solution also include a solution for printing a file acquired from a cloud service. In the solutions, a cloud link service is provided between an image forming apparatus and a cloud service and a cloud service as a connection destination is set on the cloud link service, to achieve a link between the image forming apparatus and the cloud service. This enables a user to select a cloud service to be used by using a user interface (UI) panel of the image forming apparatus, and thus the user can use the cloud service via the image forming apparatus.

Japanese Patent Application Laid-Open No. 2020-88759 discusses that an administrator of an image forming apparatus sets the availability of a cloud service for each user, and a cloud service permitted to be used by a user is displayed on an UI panel of the image forming apparatus.

In a system configuration where the cloud link service is connected with a plurality of cloud services as described above, a screen illustrated in FIG. 5B for selection of cloud services connectable from an image forming apparatus is displayed as discussed in Japanese Patent Application Laid-Open No. 2020-88759. However, the technique discussed in Japanese Patent Application Laid-Open No. 2020-88759 is not for a case of a system configuration where a plurality of cloud link services is connected.

SUMMARY

According to embodiments of the present disclosure, a cloud system includes a cloud link system configured to provide a cloud link service, the cloud link system being connected with an image forming apparatus and one or more cloud services via a network, and the image forming apparatus, wherein the image forming apparatus includes an acceptance unit configured to accept selection of the cloud link service as a function to be used by a user, a request unit configured to send, in a case where the acceptance unit accepts the selection of the cloud link service, an acquisition request to the cloud link system to acquire information about cloud services usable in the image forming apparatus, a reception unit configured to receive the information about the cloud services transmitted from the cloud link system, and a display control unit configured to control a display unit to display a list of cloud services by using the received information about the cloud services, wherein the cloud link system includes a management unit configured to manage the information about the cloud services usable in the image forming apparatus, and a transmission unit configured to transmit the information about the cloud services to the image forming apparatus in accordance with the acquisition request, based on the information about the cloud services managed by the management unit, wherein the cloud link system is connected with another cloud link system, and wherein the list of cloud services includes a first cloud service connected to the cloud link system without the another cloud link system and a second cloud service connected to the another cloud link system.

Further features of the present disclosure will become apparent from the following description of exemplary embodiments with reference to the attached drawings.

BRIEF DESCRIPTION OF THE DRAWINGS

FIG. 6 is a flowchart illustrating duplicate service control processing in the cloud link service.

DESCRIPTION OF THE EMBODIMENTS

Examples of exemplary embodiments of the present disclosure will be described below with reference to the drawings. The exemplary embodiments described below do not limit the disclosure, and not all combinations of characteristics described in the exemplary embodiments are essential for the solving means of the disclosure.

Figure 1:
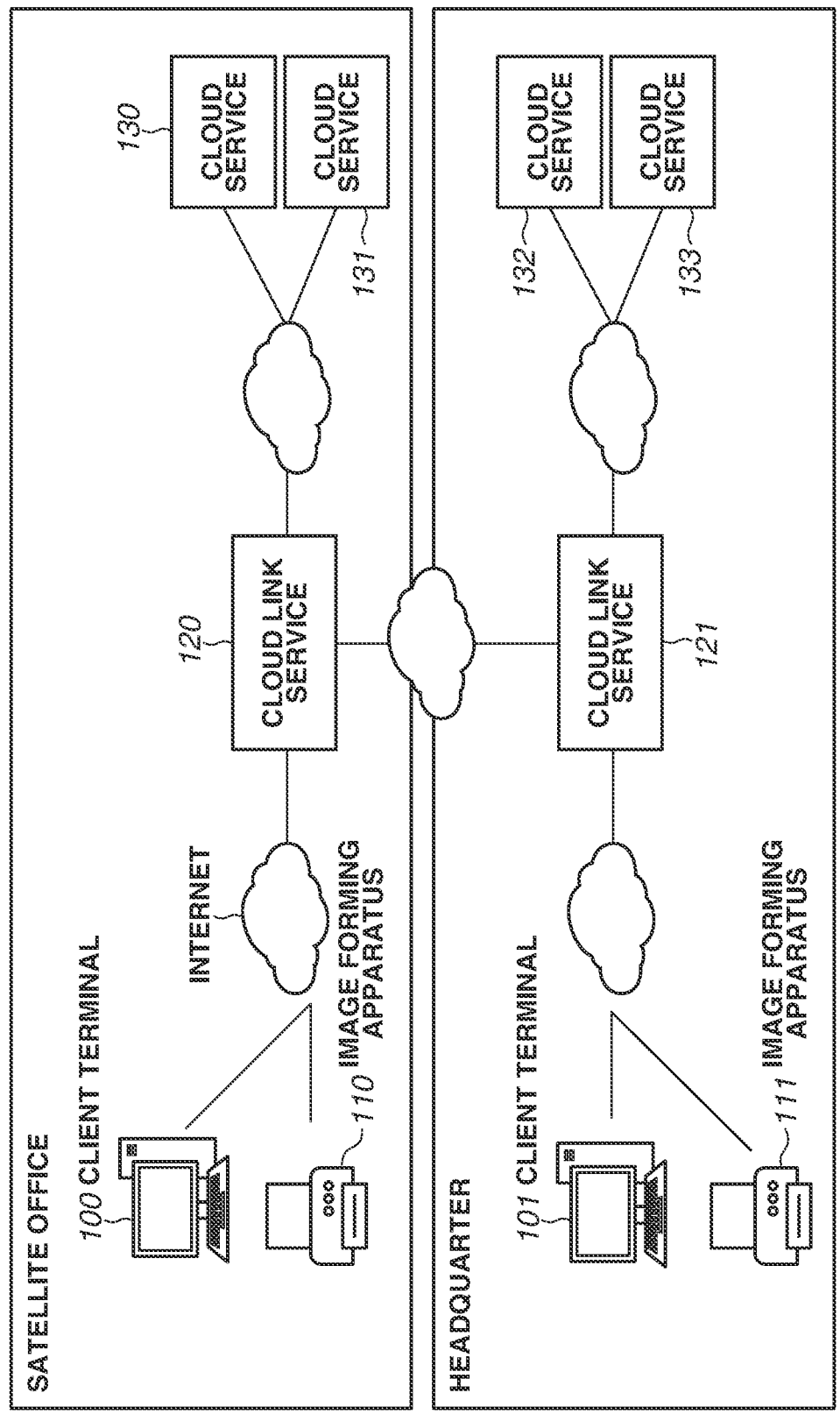
FIG. 1 is an overall view of an example of a configuration of a cloud system.

FIG. 1 illustrates a configuration of a cloud system according to the present exemplary embodiments.

In recent years, to satisfy various demands of uses, for example, a connection is established between a cloud link service 120 and a cloud link service 121, as illustrated in FIG. 1. The cloud link service 120 is managed by a satellite office, and the cloud link service 121 is managed by headquarter. In FIG. 1, the cloud link service 120 is connected with cloud services 130 and 131, and the cloud link service 121 is connected with cloud services 132 and 133.

The connection between the two cloud link services 120 and 121 enables an image forming apparatus 110 installed in the satellite office to access the cloud link service 121 via the cloud link service 120. The image forming apparatus 110 can further access the cloud services 132 and 133 connected to the cloud link service 121. That is, the connection of the two cloud link services 120 and 121 enables the image forming apparatus 110 to access not only the cloud services 130 and 131 but also the cloud services 132 and 133 via the cloud link services 120 and 121. In a similar manner, an image forming apparatus 111 can access not only the cloud services 132 and 133 but also the cloud services 130 and 131 via the cloud link services 120 and 121.

Figure 5A:
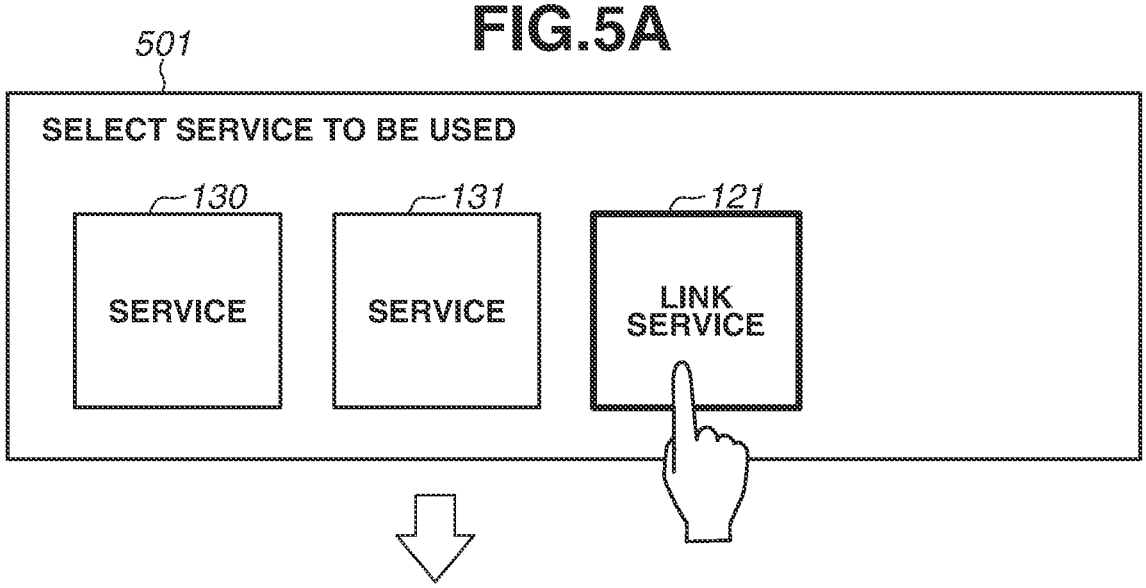
FIGS. 5A to 5C are diagrams each illustrating an example of a service selection screen of the image forming apparatus.
Figure 5B:
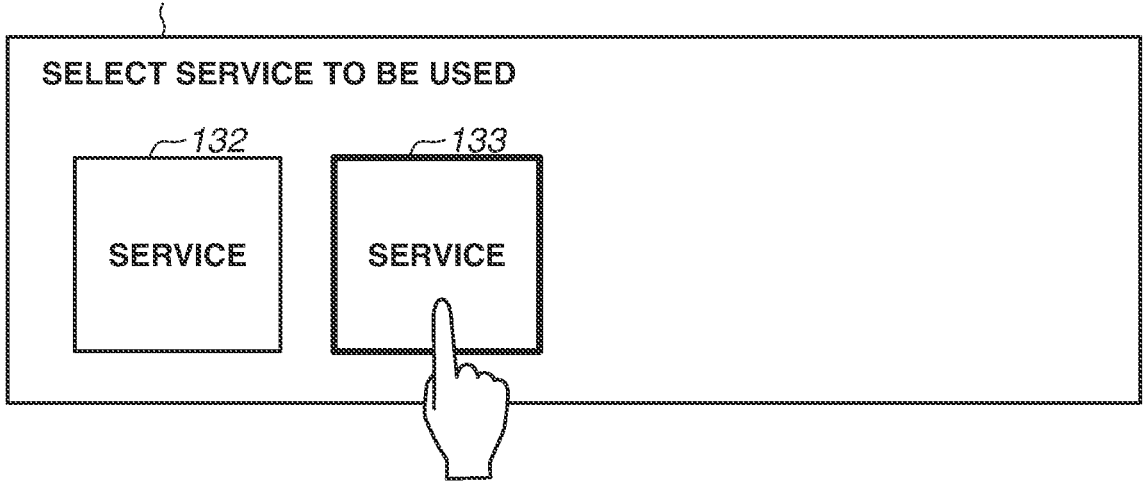
Figure 5C:
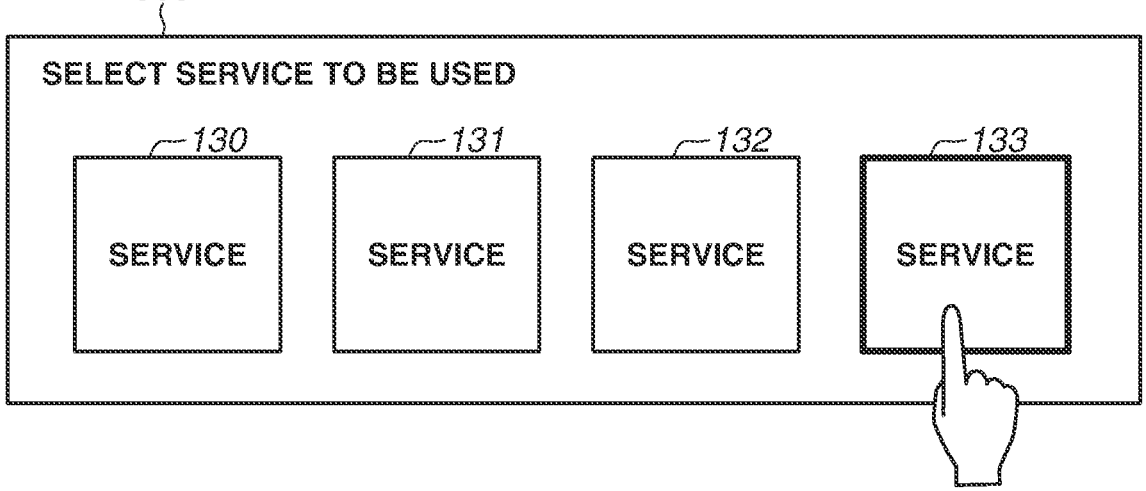

In a case where the two cloud link services 120 and 121 are connected with each other in the above-described manner, three icons are displayed on a screen 501 on the UI panel of the image forming apparatus 110 installed in the satellite office, as illustrated in FIG. 5A. Specifically, in addition to the icons of the cloud services 130 and 131, the icon of the cloud link service 121 is displayed. In a case where a user selects the cloud link service 121, two icons of the cloud services 132 and 133 connected to the cloud link service 121 are displayed on a screen 502 on the UI panel as illustrated in FIG. 5B.

More specifically, in a case where the user desires to use the cloud service 133 via the image forming apparatus 110 in the satellite office, the user has to select the icon of the cloud link service 121 on the screen 501 on the UI panel and the icon of the cloud service 133 on the screen 502 on the UI panel in this order. That is, complexity of the user operation is increased with an increase in complexity of the system configuration, and consequently the user operability in selection of a cloud service is degraded.

Client terminals 100 and 101 are client terminals on which settings of cloud link services 120 and 121 are set, respectively. Image forming apparatuses 110 and 111 are multi-function apparatuses each having a plurality of functions, such as a scan function and a print function. The cloud link services 120 and 121 are examples of services having a function for transmitting image files scanned by the image forming apparatuses 110 and 111, respectively, to external cloud services 130 to 133. The cloud link services 120 and 121 are services provided by a cloud link system and each are connected with one or more cloud services. The cloud services 130 to 133 are web services that can be used as various applications, such as a storage, a basic system, and a work system.

On the above-described configuration, the image forming apparatus 110 transmits a scanned image to the cloud services 130 and 131 via the cloud link service 120. Further, the cloud link service 120 can access to the cloud services 132 and 133 via the cloud link service 121. That is, the image forming apparatus 110 can also transmit a scanned image to the cloud services 132 and 133 via the cloud link services 120 and 121.

Examples of methods to operate a plurality of services in a linked manner in the system according to the exemplary embodiments include a method using authentication, such as Open Authorization (OAuth). This technique can achieve establishment of a link between the cloud link service 120 and the cloud services 130 and 131, a link between the cloud link service 121 and the cloud services 132 and 133, and a link between the cloud link services 120 and 121.

While the system according to the exemplary embodiments has the configuration including the image forming apparatuses 110 and 111 and the cloud link services 120 and 121, the configuration is not limited thereto. For example, the image forming apparatus 110 can also function as the cloud link service 120. The cloud link services 120 and 121 can be provided and connected with each other not on the Internet but on a local area network (LAN) server. The above-described components are connected via a network to communicate with each other. The network is, for example, any one of a LAN, a wide area network (WAN), a telephone line, a dedicated digital line, and an asynchronous transfer mode (ATM) of the Internet. Alternatively, the network can be a communication network in combination of the above-described networks. Any network can be used as long as data can be transmitted and received.

Figure 2:
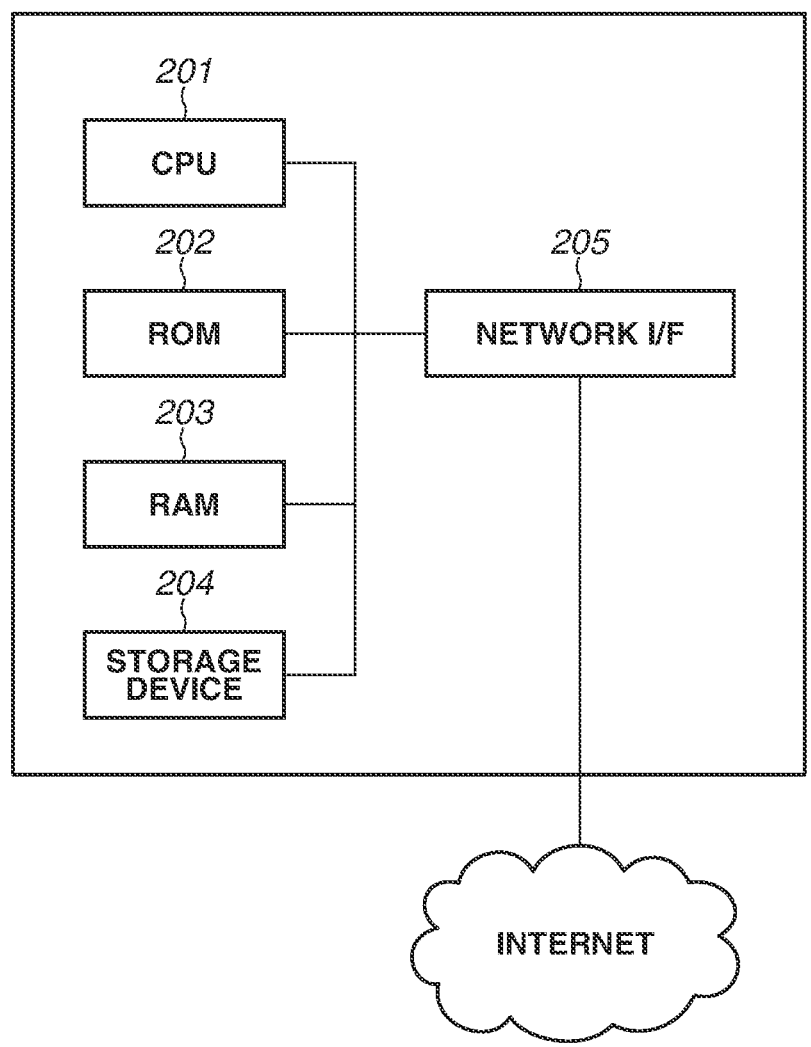
FIG. 2 is a diagram illustrating an example of a hardware configuration of an image forming apparatus.

FIG. 2 illustrates an example of a hardware configuration of an information processing apparatus. The information processing apparatus according to the exemplary embodiments includes a server computer on a data center where a cloud link system that provides the cloud link service 120 is structured. The same applies to the cloud link service 121 and the cloud services 130 to 133. The general hardware configuration of the information processing apparatus can be applied also to the client terminals 100 and 101 and the image forming apparatuses 110 and 111 according to the exemplary embodiments, and can have a configuration, not illustrated in FIG. 2.

A central processing unit (CPU) 201 directly or indirectly controls devices (a read only memory (ROM), a random access memory (RAM), and the like), each of which is internally connected to the CPU 201, to execute a program for achieving the exemplary embodiments of the present disclosure. A ROM 202 stores a basic input output system (BIOS). A RAM (direct storage device) 203 is used as a work area of the CPU 201 and is used as a primary storage where a software module for achieving exemplary embodiments of the present disclosure is loaded. A storage device 204 stores an operating system (OS) serving as basic software and applications. Specific examples of the storage device 204 include a hard disc drive (HDD) and a solid state drive (SSD). A network interface (I/F) 205 is an interface for connection to the Internet and a network. The cloud link services 120 and 121 accept a processing request from the client terminals 100 and 101, the image forming apparatuses 110 and 111, and the cloud services 130 to 133 via the respective network I/Fs 205, perform various processing, and transmit and receive information.

Figure 3:
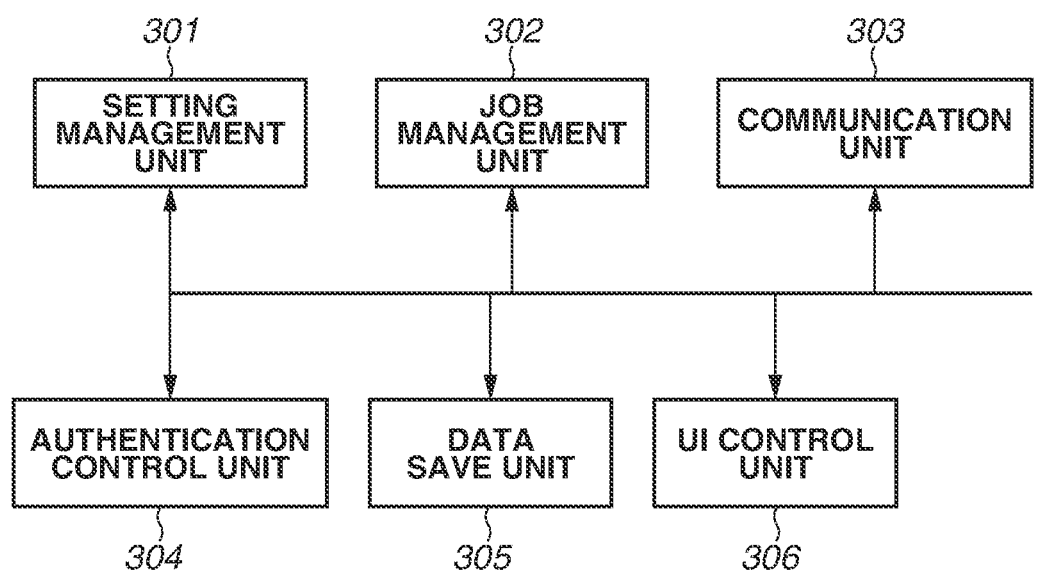
FIG. 3 is a diagram illustrating an example of a software configuration of a cloud link service.

FIG. 3 illustrates an example of a software configuration of the cloud link services 120 and 121. The cloud link service 120 will be described as a typical example, and since the cloud link service 121 has the configuration similar to the cloud link service 120, the redundant description is omitted.

The software configuration illustrated in FIG. 3 is achieved by, for example, the CPU 201 reading the program stored in the ROM 202 into the RAM 203 and executing the program. A setting management unit 301 stores settings relating to the various functions of the cloud link service 120 in the memories, such as the RAM 203 and the storage device 204, and reads the settings from the memories. A job management unit 302 saves a job received from the image forming apparatus 110 in a data save unit 305. A communication unit 303 has a function for connecting to the components. An authentication control unit 304 has a function for achieving the authentication, such as OAuth. A user interface (UI) control unit 306 has a function for achieving UI display on the cloud link service 120 and various functions on the UI.

[Software Processing in First Exemplary Embodiment]

A description will be given of a method for improving the operability of a UI panel in a case where a user selects a service linked with the cloud link service 121 from the image forming apparatus 110.

Figure 4:
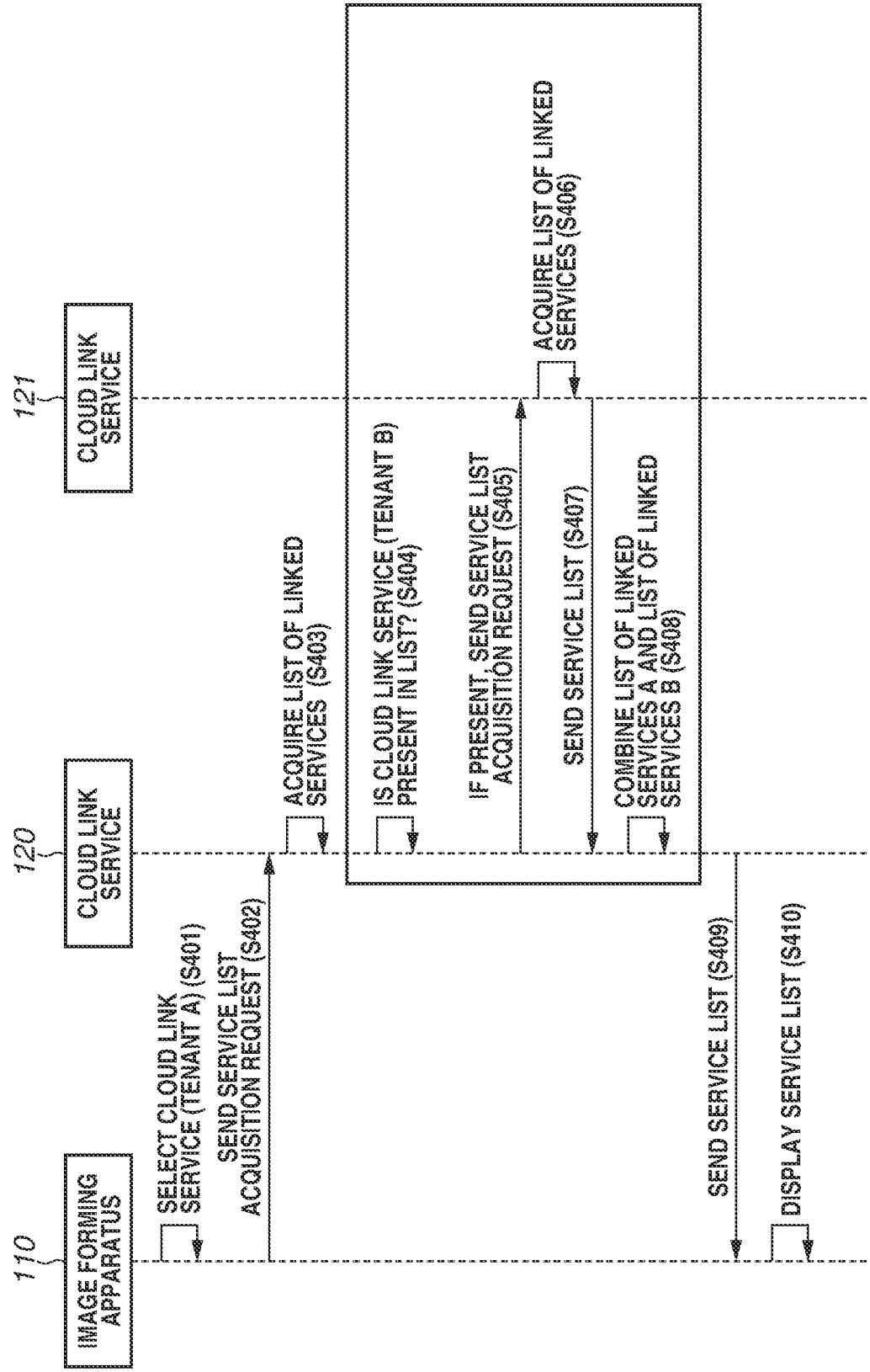
FIG. 4 is a sequence diagram illustrating processing between apparatuses.

FIG. 4 is a sequence diagram illustrating the processing that is performed by the image forming apparatus 110 and the cloud link services 120 and 121. In this sequence, the image forming apparatus 110 displays a list of services linked with the cloud link services 120 and 121.

When the user operates the image forming apparatus 110, in step S401, the image forming apparatus 110 determines whether the cloud link service 120 is selected on the UI panel. In a case where the image forming apparatus 110 determines that the cloud link service 120 is selected, the processing proceeds to step S402.

In step S402, the image forming apparatus 110 requests the cloud link service 120 to acquire a list of linked services.

In step S403, the cloud link service 120 acquires the list of services (A) linked with the cloud link service 120. Table 1 is an example of the list of services (A) and includes service names and service uniform resource locators (URLs). Table 1 includes a service A 130, a service B 131, and the cloud link service 121, and the three services are linked with the cloud link service 120. Information that can be acquired as the list of services is not particularly limited as long as the information relates to services linked with the cloud link service 120.

TABLE 1

List of Services (A)

| Service name | Service URL |
| --- | --- |
| Service A 130 | http://service-a.com/ |
| Service B 131 | http://service-b.com/ |
| Cloud link service 121 | http://server121.image-handle.com/ |

In step S404, the cloud link service 120 determines whether the cloud link service 121 is in the list of services (A). For example, in a case where the service URL in the list of services (A) acquired in step S403 includes a certain domain, for example "image-handle.com", the cloud link service 120 determines that the cloud link service 121 is in the list of services (A). In case where the cloud link service 120 determines that the cloud link service 121 is in the list of services (A), the processing proceeds to step S405. In a case where the cloud link service 120 determines that the cloud link service 121 is not in the list of services (A), the processing proceeds to step S409. While, in the first exemplary embodiment, the presence or non-presence of a service is determined based on the URL of the domain, the determination method is not particularly limited thereto as long as the presence or non-presence can be determined.

In step S405, the cloud link service 120 requests the cloud link service 121 to acquire a list of services linked with the cloud link service 121.

In step S406, the cloud link service 121 acquires a list of services (B) linked with the cloud link service 121. Table 2 is an example of the list of services (B) and includes service names and service URLs. Table 2 includes a service C 132 and a service D 133, and the two services are linked with the cloud link service 121.

TABLE 2

List of Services (B)

| Service name | Service URL |
| --- | --- |
| Service C 132 | http://service-c.com/ |
| Service D 133 | http://service-d.com/ |

In step S407, the cloud link service 121 notifies the cloud link service 120 of the list of services (B).

In step S408, the cloud link service 120 combines the list of services (A) and the list of services (B). In the combined list of services (Table 3), information about cloud services usable in the image forming apparatus 110 is managed. The combined list of services includes the cloud services 130 and 131 connected to the cloud link service 120 and the cloud services 132 and 133 connected to the cloud link service 121. Here, the cloud link service 121 included in the list of services (A) is excluded.

TABLE 3

List of Combined Services (A + B)

| Service name | Service URL |
| --- | --- |
| Service A 130 | http://service-a.com/ |
| Service B 131 | http://service-b.com/ |
| Service C 132 | http://service-c.com/ |
| Service D 133 | http://service-d.com/ |

In step S409, the cloud link service 120 notifies the image forming apparatus 110 of the list of services (A+B) combined in step S408. The cloud link service 120 transmits information about cloud services usable in the image forming apparatus 110 to the image forming apparatus 110. Meanwhile, in step S404, in a case where the cloud link service 120 determines that the cloud link service 121 is not in the list of services (A), the information to be notified is only the list of services (A). In step S410, the image forming apparatus 110 controls a display unit (not illustrated) to display the list of cloud services by using the received information about the cloud services. The display unit can be an operation panel of the image forming apparatus 110 or a display of a different apparatus. The user can select any one of the cloud services 130 to 133 from the list of cloud services displayed on the display unit.

As described above, conventionally, the user has to perform the selection operation twice on the screens 501 and 502 on the UI panel of the image forming apparatus 110 to select a service linked with the cloud link service 121 on the image forming apparatus 110. With the method for displaying the list of services, according to the first exemplary embodiment, the list of services linked with the cloud link services 120 and 121 are displayed on the UI panel of the image forming apparatus 110. Accordingly, the user can select a service linked with the cloud link service 121 by performing the selection operation once on a screen 503 on the UI panel of the image forming apparatus 110, whereby the user operability is improved. While, in the first exemplary embodiment, acquisition of information about a list of services is performed every time when the user performs the operation, a series of the processing can be skipped, in a case where the information about the list of services has been acquired in the past, by using cache information acquired during previous execution of the processing.

[Software Processing in Second Exemplary Embodiment]

Figure 7A:
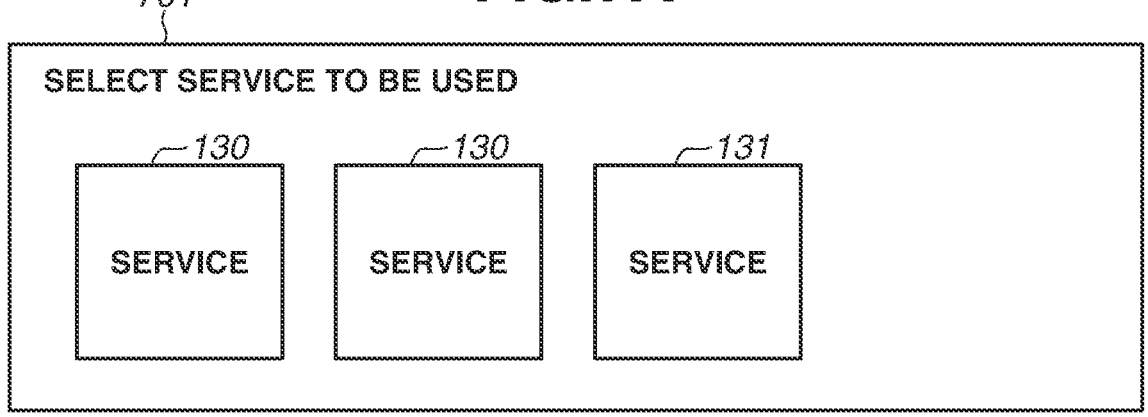
FIGS. 7A to 7C are diagrams each illustrating an example of a service selection screen of the image forming apparatus.

In the above description, according to the first exemplary embodiment, the services linked with the cloud link services 120 and 121 are collectively displayed. According to the method, however, in a case where the cloud link services 120 and 121 are linked with the same service, the same service is displayed repetitively on the UI panel of the image forming apparatus 110. For example, on a screen 701 on the UI panel illustrated in FIG. 7A, the cloud service 130 linked with the cloud link service 120 and the cloud service 130 linked with the cloud link service 121 are displayed as duplicate icons. Since a display area of the UI panel is limited, if the number of linked services is many, the linked services cannot be displayed on one screen, and consequently the usability is degraded.

Thus, in a case where a service is repetitively displayed, one service may be hidden to improve the usability. However, this measure is not always effective. For example, in a case where different accounts are used for the same service that is to be displayed repetitively, if one of duplicate icons of the service is hidden only to avoid duplication, the user cannot use the service by using an intended account.

Such an issue will be specifically described using an example case where an account that is used for the cloud service 130 linked with the cloud link service 120 is "user A", and an account that is used for the cloud service 130 linked with the cloud link service 121 is "user B". In this case, if the cloud service 130 linked with the cloud link service 120 is hidden from the UI panel, the user cannot use the cloud service 130 on the image forming apparatus 110 by using the account "user A".

In the second exemplary embodiment, in addition to the method in the first exemplary embodiment, duplicate display of a service is efficiently performed without degrading the usability of the UI panel. According to the second exemplary embodiment, the redundant descriptions about the system configuration, the application UIs, and the like, similar to those in the first exemplary embodiment are omitted.

[Software Processing in Second Exemplary Embodiment and Flowchart]

FIG. 6 is a flowchart illustrating detailed processing relating to a duplicate service in the cloud link service 120. This processing is started after execution of the processing in step S408 in the first exemplary embodiment.

In step S601, determination of whether a duplicate service exists. For example, Table 4 shows an example of the list of services (A+B), and includes a service name, a service URL, and a cloud link service, and an account.

TABLE 4

Combined List of Services (A + B)

| Service name | Service URL | Cloud link service | Account |
|---|---|---|---|
| Service A 130 | http://service-a.com/ | 120 | User A |
| Service A 130 | http://service-a.com/ | 121 | User A |
| Service B 131 | http://service-b.com/ | 121 | User B |

In Table 4, the service A 130 is managed as the service linked with the cloud link service 120 in association with the account "user A". Further, the service A 130 is managed as the service linked with the cloud link service 121 in association with the account "user A", and the service B 131 is managed as the service linked with the cloud link service 121 in association with the account "user B". That is, in Table 4, the service A 130 is managed in duplicate, and thus it is determined that a duplicate service exists. In a case where a duplicate service exists (YES in step S601), the processing proceeds to step S602. In a case where a duplicate service does not exist (NO in step S601), the processing ends.

In step S602, determination of whether accounts of the duplicate service are same each other. For example, as shown in Table 4, the service A 130 is managed in duplicate, and accounts for the duplicate service are both the same "user A". In this case, it is determined that the accounts for the duplicate service are same each other. In a case where the accounts are same each other (YES in step S602), the processing proceeds to step S603. In a case where the accounts are not same each other (NO in step S602), the processing ends.

In step S603, one of items of the service managed in duplicate in Table 4 and using the same account is deleted from the list of services to obtain Table 5, and the processing ends.

TABLE 5

List of Services after Duplicate Service Deletion (A + B)

| Service name | Service URL | Cloud link service | Account |
|---|---|---|---|
| Service A 130 | http://service-a.com/ | 120 | User A |
| Service B 131 | http://service-b.com/ | 121 | User B |

Figure 7B:
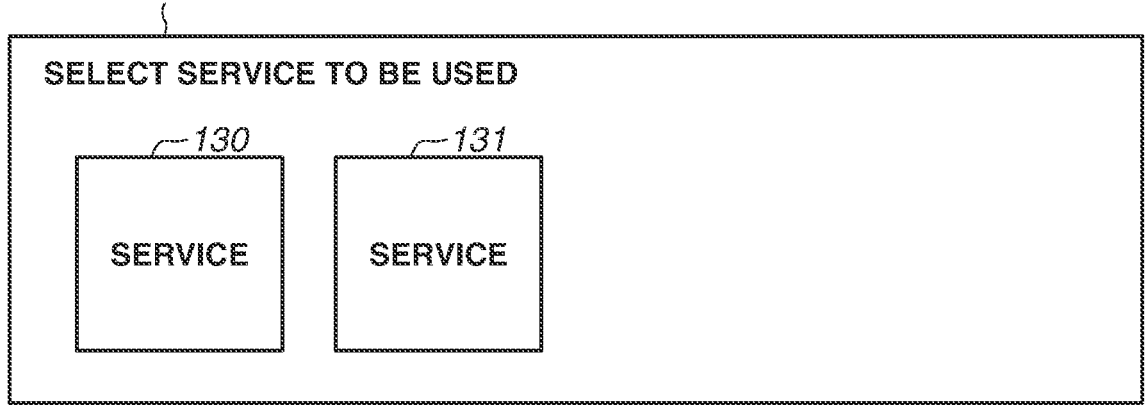

Due to the processing in step S603, the cloud link service 120 can avoid sending a notification of a duplicate service to image forming apparatus 110 in step S409, and thus minimum required services are displayed like a screen 702 on the UI panel illustrated in FIG. 7B. While, in the second exemplary embodiment, the service A 130 linked with the cloud link service 121 is deleted, the service A 130 linked with the cloud link service 120 can be deleted.

The method for displaying the minimum required services on the UI panel of the image forming apparatus 110, based on the information about the duplicate service and the accounts for using the duplicate service is described above. According to the method, display of duplicate service is performed efficiently without degrading the usability of the UI panel.

Figure 7C:
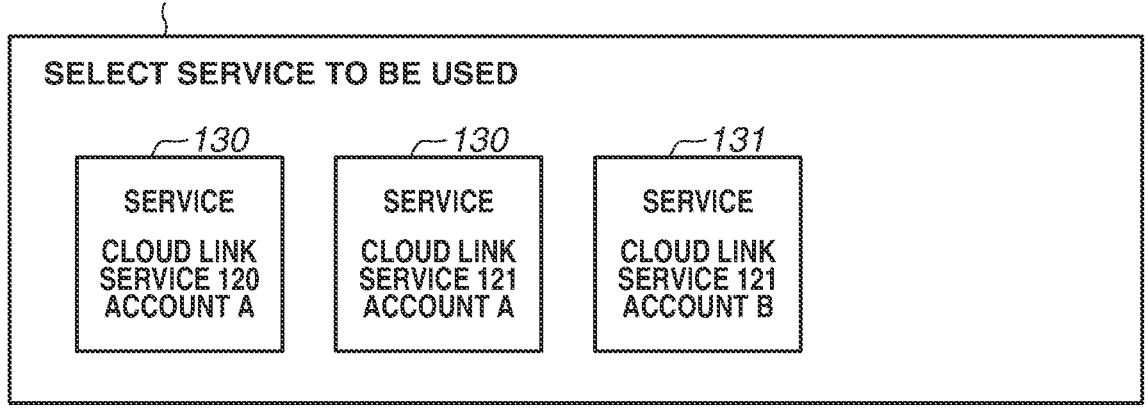

In the second exemplary embodiment, duplicate display of a service is suppressed to avoid the degradation of the usability. However, in a case where a same service is used by different accounts, services having the same name are displayed on the UI panel of the image forming apparatus 110, like the screen 701 illustrated in FIG. 7A. Consequently, for example, in a case where the user desires to select the cloud service 130 with the account of the user B, the user cannot identify which account is to be selected, to use the cloud service by using the desired account. Thus, like a screen 703 illustrated in FIG. 7C, not only the cloud service name but also at least one of specific names of the cloud link service and the account can be displayed in association with the cloud service name, on each icon. As a result, even in a case where a duplicate service exists and accounts using the duplicate service are different from each other, a desired service with a desired account can be appropriately selected.

According to the first and second exemplary embodiments of the present disclosure, in the system configuration where the plurality of cloud link services is connected with each other, the user operability for selecting a cloud service can be improved.

Other Embodiment

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-199142, filed Dec. 8, 2021, which is hereby incorporated by reference herein in its entirety.

What is claimed is:

1. A cloud system comprising:
a first cloud link system configured to provide a first cloud link service, the first cloud link system being connected with an image forming apparatus and one or more cloud services via a network; and
the image forming apparatus,
wherein the image forming apparatus includes:
first one or more processors; and
first at least one memory storing first instructions, which when executed by the first one or more processors, cause the image forming apparatus to:
accept selection of the first cloud link service by a user;
send, in a case where the selection of the cloud link service is accepted, an acquisition request to the first cloud link system to acquire information about cloud services usable in the image forming apparatus;
receive the information about the cloud services usable in the image forming apparatus from the first cloud link system; and
control a display unit to display a list of the cloud services usable in the image forming apparatus by using the received information about the cloud services usable in the image forming apparatus,
wherein the first cloud link system includes:
second one or more processors; and
second at least one memory storing second instructions, which when executed by the second one or more processors, cause the first cloud link system to:
manage information about first cloud services connected to the first cloud link system;
acquire information about second cloud services connected to a second cloud link system if the managed information about the first cloud services includes information about a second cloud link service provided by the second cloud link system;
combine the managed information about the first cloud services and the acquired information about the second cloud services to generate the information about the cloud services usable in the image forming apparatus, wherein the generated information about the cloud services usable in the image forming apparatus does not include the information about the second cloud link service; and transmit the generated information about the cloud services usable in the image forming apparatus to the image forming apparatus in accordance with the acquisition request,
wherein the displayed list of the cloud services usable in the image forming apparatus includes the information about the second cloud services and the information about the first cloud services other than the information about the second cloud link service.

2. The cloud system according to claim 1, wherein the user can select any cloud service from the displayed list of the cloud services usable in the image forming apparatus.

3. The cloud system according to claim 1, wherein the second instructions, when executed by the second one or more processors, cause the first cloud link system to:
manage the information about the first cloud services in such a manner that each of the first cloud services is associated with an account; and
in a case where both of the information about the first cloud services and the acquired information about the second cloud services include the same cloud service associated with the same account, combine the managed information about the first cloud services and the acquired information about the second cloud services to generate the information about the cloud services which include information about the same cloud service as the information about the one cloud service.

4. The cloud system according to claim 1, wherein the first instructions, when executed by the first one or more processors, cause the image forming apparatus to:
control the display unit to further display, in the list of the cloud services usable in the image forming apparatus, information about the first or second cloud link system connected with each of the cloud services in association with the displayed information about the cloud services usable in the image forming apparatus.

5. The cloud system according to claim 1, wherein the first instructions, when executed by the first one or more processors, cause the image forming apparatus to:
in a case where both of the information about the first cloud services and the information about the second cloud services include the same cloud service, in the list of cloud services usable in the image forming apparatus, control the display unit to display information about the first or second cloud link system connected with the same cloud service in association with the information about the same cloud service.

6. The cloud system according to claim 1, wherein the display unit is included in the image forming apparatus.

7. A first cloud link system that is connected with an image forming apparatus and one or more cloud services via a network and provides a first cloud link service, the first cloud link system comprising:
one or more processors; and
at least one memory storing instructions, which when executed by the one or more processors, cause the first cloud link system to:
manage information about first cloud services connected to the first cloud link system;
acquire information about second cloud services connected to a second cloud link system if the managed information about the first cloud services includes information about a second cloud link service provided by the second cloud link system;
combine the managed information about the first cloud services and the acquired information about the second cloud services to generate the information about the cloud services usable in the image forming apparatus, wherein the generated information about the cloud services usable in the image forming apparatus does not include the information about the second cloud link service; and transmit the generated information about the cloud services usable in the image forming apparatus to the image forming apparatus, in response to an acquisition request to acquire the information about the cloud services usable in the image forming apparatus, wherein the image forming apparatus displays, as the information about the cloud services usable in the image forming apparatus, the information about the second cloud services and the information about the first cloud services other than the information about the second cloud link service.

8. A non-transitory computer readable storage medium that stores one or more programs, wherein the one or more programs cause one or more processors of a first cloud link system, that is connected with an image forming apparatus and provides a first cloud link service, to perform:

managing information about first cloud services connected to the first cloud link system;

acquiring information about second cloud services connected to a second cloud link system if the managed information about the first cloud services includes information about a second cloud link service provided by the second cloud link system;

combining the managed information about the first cloud services and the acquired information about the second cloud services to generate the information about the cloud services usable in the image forming apparatus, wherein the generated information about the cloud services usable in the image forming apparatus does not include the information about the second cloud link service; and transmitting the generated information about the cloud services usable in the image forming apparatus to the image forming apparatus, in response to an acquisition request to acquire the information about the cloud services usable in the image forming apparatus, wherein the image forming apparatus displays, as the information about the cloud services usable in the image forming apparatus, the information about the second cloud services and the information about the first cloud services other than the information about the second cloud link service.

* * * * *